July 24, 1951

W. L. GARFIELD 2,561,357

FREQUENCY MONITORING AND INDICATING SYSTEM

Filed Dec. 24, 1947

INVENTOR
WILLIAM L. GARFIELD
BY
Robert Harding Jr.
ATTORNEY

Patented July 24, 1951

2,561,357

UNITED STATES PATENT OFFICE 2,561,357

FREQUENCY MONITORING AND INDICATING SYSTEM

William Littery Garfield, London, England, assignor to International Standard Electric Corporation, New York, N. Y., a corporation of Delaware Application December 24, 1947, Serial No. 793,745
In Great Britain February 5, 1947

3 Claims. (Cl. 177—311)

This invention relates to equipment for measuring and indicating electrical values such as the frequency of alternating electric current or the rate of change of frequency.

It is the object of the invention to give warning signals when certain undesirable conditions occur.

One feature of the invention comprises equipment for monitoring the frequency of alternating current comprising means for giving a signal when the frequency varies by a pre-determined amount from a given value in a given direction of change (e. g. below 50 c. p. s.).

Another feature of the invention comprises equipment for monitoring the frequency of alternating current comprising means for determining the rate of change of frequency and for giving a signal when the rate of change exceeds a given value in a given direction of change (e. g. decrease in frequency).

Figure 1:
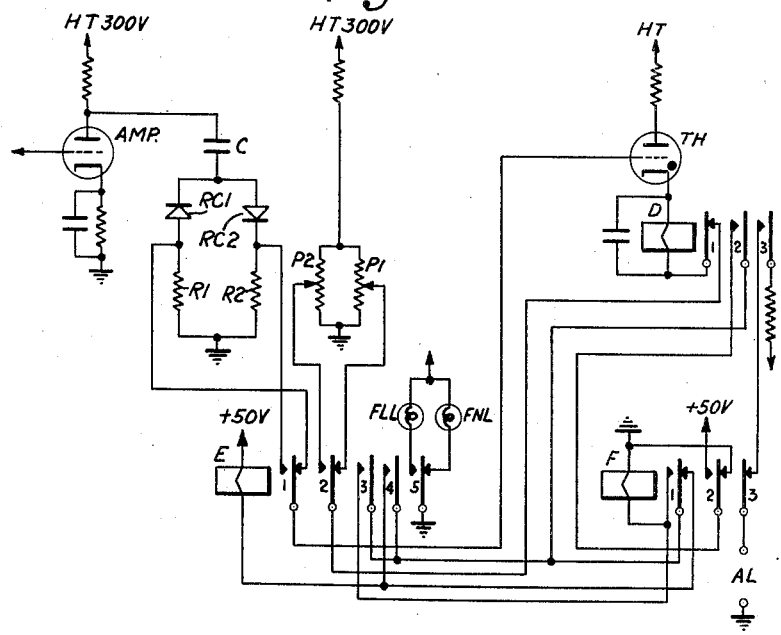
Figure 2:
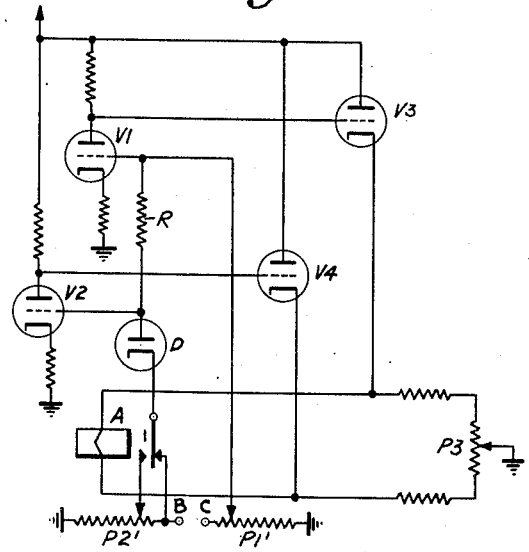

The invention will be described with reference to certain embodiments shown in the accompanying drawings in which:

Fig. 1 shows a circuit for giving signals when the frequency of an alternating current electric supply varies beyond a certain amount from a desired value, while Fig. 2 shows a circuit for giving signals when the rate of change of the frequency of an alternating current electric supply exceeds a predetermined value.

Referring first to Fig. 1 it is assumed that a multiple of the mains frequency, the standard value of which is 50 c. p. s., has been mixed with a fixed frequency which is above the range of multiplied mains frequency to be dealt with. A difference frequency is derived in this way whether the actual mains frequency is above or below 50 c. p. s.

Such an arrangement in which however the fixed frequency was below the range of multiplied mains frequency is described in British Patents Nos. 617,269 and 626,700. In the first of these patents there is described an apparatus wherein the mains frequency is translated into a unidirectional potential and successive readings of this potential are compared in order to determine and indicate the magnitude and direction of any changes. In the second of the patents there is described an apparatus for indicating instantaneous mains frequency and rate of change of mains frequency comprising a mains driven synchronous motor having a phonic wheel and at least one aperiodic frequency doubler for raising the frequency to about 12,000 cycles per second. This multiplied frequency and a reference frequency derived from an auxiliary source are mixed and the frequency difference is measured with the apparatus of the other patent. It will be seen that with this arrangement as the reference frequency is below the multiplied mains frequency, the difference frequency increases as the mains frequency decreases. However it would also be desirable if the frequency monitoring equipment not only metered the frequency but also signalled the occurrence of frequency variations urgently requiring action to boost generation of shed load. An object of the present invention is to provide an apparatus capable of accomplishing these functions.

Referring now to Fig. 1, a control circuit is illustrated comprising an amplifier tube AMP having a grid, to which is applied a unidirectional potential corresponding to a difference frequency and produced as above described, and an anode which is connected via a coupling condenser C to two parallel circuits to earth. The parallel circuits comprise oppositely-poled rectifiers RC1, RC2, and resistances R1, R2. These circuit elements amplify the difference frequency and using the charge and discharge of the capacitor C, together with the rectifiers and load resistors, produce a unidirectional output which is directly proportional to the input or difference frequency. The connections between each rectifier and its resistance are in turn connected to front and back contacts of a relay contact spring e1 which belongs to a relay E, and which is itself connected to the grid of a thyratron TH.

The thyratron cathode is connected via a relay D, shunted by a condenser to render it slow to operate and release, through normally closed contacts d1, and change-over contacts e2 to one or other of two potentiometers P1, P2.

When the mains frequency is well above the danger line, the circuit is in the condition shown. As the frequency falls and reaches the value to be signalled, the unidirectional voltage from the anode of the amplifier AMP applied to the condenser C and the network RC1—R1 increases and, being applied to the grid of the thyratron, eventually reaches a value such as to cause discharge of thyratron. The difference frequency at which thyratron will discharge can be varied by the setting of potentiometer P1. Relay D operates upon firing of the thyratron completing the circuit via d1, e2, P1, and closes contacts d2 which cause relay E to energise via f1, d2, f2. Where relay E is energized, the switch e1 is operated whereby the thyratron grid is connected to the midpoint of the RC2—R2 bridge in the anode circuit of the tube AMP, thereby applying a bias to the thyratron grid such as to preclude firing a second time when the contacts $d1$ in the thyratron cathode circuit are subsequently restored to normal closed-contact position. Contacts $e3$ close but relay F is not operated as it is short-circuited via $e3$, $d2$, $f2$.

Contacts $d3$ close a circuit $f3$ for an alarm bell or the like AL, while contacts $e5$ open the circuit of a "frequency normal" lamp FNL and close the circuit of a "frequency low" lamp FLL. The attendant is therefore advised both audibly and visually of the condition.

On operating relay D opens the thyratron circuit at $d1$, and itself releases after a short interval. Contacts $d3$ open to cut off the audible alarm. Contacts $d2$ open in one branch of the energising circuit of E, which however holds via $e4$, $e3$ in series with relay F which operates. Contacts $e1$ now connect the mid-point of RC2, R2 to the thyratron grid as above mentioned, while contacts $e2$ replace P1 by P2 in the circuit of the thyratron cathode. P2 is set so that the reduction in the difference frequency to a given value will cause the thyratron to discharge again. P2 will usually be set so that the thyratron will not discharge for the second time until remedial operations have caused the mains frequency to rise to a value above that at which the thyratron was first caused to operate so that the visual warning of low frequency is maintained until a reasonably safe condition is reached.

The second operation of D does not operate the alarm AL as $f3$ is open. Closure of contacts $d2$ now short-circuits E via $e4$, $d2$, $f2$. Relay E releases. Relay F holds via $f1$, $d2$, $f2$, until D releases due to the opening of contacts $d1$. FLL is now extinguished and FNL is lighted, and contacts $e1$, $e2$ have reverted to normal position.

Referring now to Fig. 2, a D. C. potential proportional to the rate of change of frequency, produced in any desired manner, for instance as described in the above-mentioned British patents, is applied across the terminals B, C to which are connected two potentiometer resistances P1', P2' terminated by earth. The cursor of the potentiometer P1' connected to terminal C is connected to one end of a resistance R the other end of which is connected to the anode of a diode or gas discharge tube D, the cathode of which is connected to a change-over relay contact $a1$, the contacts of which are connected to terminal B and the cursor of the potentiometer P2', associated with terminal B respectively.

The two ends of the resistance R are connected to the grids of the first stage vacuum tubes V1, V2 of a two-stage balanced amplifier V1—V4, provided with a balancing potentiometer P3.

Increase of the rate of change in the downward direction causes potential conditions across R due to a discharge through tube D sufficient to cause current to flow through relay A and operate it. Relay A would change over contacts $a1$ and operate a suitable switch or the like controlling a warning lamp (not shown). Relay A could if necessary operate an audible alarm, in which case additional control relays would be necessary similar to those described above in connection with Fig. 1.

When due to control operations the rate of change reaches a predetermined value either downwards or upwards, then the potential across R will drop and relay A will release, extinguishing the danger lamp. The condition at which the warning signal is removed can be varied and made different from the condition at which the warning signal is operated by means of the potentiometer P2'.

Relay A then releases and returns the circuit to normal.

There is no need to give a signal when the rate of change in the upward direction is high, although of course this could be done. Similarly in Fig. 1 abnormally high frequency could be signalled if desired as well as abnormally low frequency.

What is claimed is:

1. A device for monitoring a frequency source that comprises: a gas-tube having a control electrode; a first voltage-producing means sensitive to increases of the monitored frequency for producing a direct voltage proportional to the increase and reaching the firing voltage of the gas-tube when the frequency increase reaches a predetermined maximum; a second voltage-producing means sensitive to decreases of the monitored frequency for producing a direct voltage proportional to the decrease and reaching the firing voltage of the gas-tube when the frequency decreases from said predetermined maximum to its normal magnitude; a first and a second visual indicating means; switching means operated by firing of the gas-tube by said first voltage-producing means and automatically restoring to its normal condition subsequent to operation said switching means when in normal condition operating said first indicating means and connecting the gas-tube control electrode to said first voltage-producing means and when operated connecting said electrode to the second voltage-producing means and operating said second indicating means while simultaneously inactivating said first indicating means.

2. A device for monitoring a frequency source that comprises: a gas-tube having a control electrode; a first voltage-producing means sensitive to increases of the monitored frequency for producing a direct voltage proportional to the increase and reaching the firing voltage of the gas-tube when the frequency increase reaches a predetermined maximum; a second voltage-producing means sensitive to decreases of the monitored frequency for producing a direct voltage proportional to the decrease and reaching the firing voltage of the gas-tube when the frequency decreases from said predetermined maximum to its normal magnitude; a first and a second visual indicating means; a first, second and third switching means; said first switching means, when operated by firing of the gas-tube by said first voltage-producing means, opening the gas-tube cathode circuit and operating said second switching means, said first switching means being automatically restored to its normal condition subsequent to operation; said second switching means when in normal condition completing the circuit from said first voltage-producing means to the gas-tube control electrode and in normal condition operating said first indicating means, said second switching means when operated connecting said electrode to the second voltage-producing means, said second indicating means and said third switching means; said third switching means, when in normal condition connecting said audible signalling means and said second switching means for operation by said first switching means, said third switching means when operated connecting the second signalling means for restoration to its normal condition by operation of said first switching means and being itself restored to normal condition by the automatic restoration of said first switching means to its normal condition.

3. A device for monitoring a frequency source that comprises: a gas-tube having a control electrode; a first voltage-producing means sensitive to increases of the monitored frequency for producing a direct voltage proportional to the increase and reaching the firing voltage of the gas-tube when the frequency increase reaches a predetermined maximum; a second voltage-producing means sensitive to decreases of the monitored frequency for producing a direct voltage proportional to the decrease and reaching the firing voltage of the gas-tube when the frequency decreases from said predetermined maximum to its normal magnitude; a first and a second visual indicating means; an audible signalling means; a first, second and third switching means; said first switching means, when operated by firing of the gas-tube by said first voltage-producing means, opening the gas-tube cathode circuit and operating said second switching means, said first switching means being automatically restored to its normal condition subsequent to operation; said second switching means when in normal condition completing the circuit from said first voltage-producing means to the gas-tube control electrode and in normal condition operating said first indicating means, said second switching means when operated connecting said electrode to the second voltage-producing means, operating said audible signaling means, said second indicating means and said third switching means; said third switching means, when in normal condition connecting said audible signalling means and said second switching means for operation by said first switching means, said third switching means when operated inactivating the audible signalling means and connecting the second signalling means for restoration to its normal condition by operation of said first switching means and being itself restored to normal condition by the automatic restoration of said first switching means to its normal condition.

WILLIAM LITTERY GARFIELD.

REFERENCES CITED

The following references are of record in the file of this patent:

UNITED STATES PATENTS

| Number | Name | Date |
| --- | --- | --- |
| 1,647,270 | Burton | Nov. 1, 1927 |
| 1,781,497 | Crago | Nov. 11, 1930 |
| 1,977,776 | Rea | Oct. 23, 1934 |
| 2,112,826 | Cook | Apr. 5, 1938 |
| 2,421,771 | Browning | June 10, 1947 |